United States Patent
Pirc et al.

(10) Patent No.: US 10,078,127 B2
(45) Date of Patent: Sep. 18, 2018

(54) TRACKING SPATIAL PLACEMENT OF HF RFID TAG OBJECTS ON A SURFACE USING MULTIPLE RECEPTION ANTENNAS

(71) Applicant: NXP B.V., Eindhoven (NL)

(72) Inventors: Peter Pirc, Styria (AT); Tvrtko Barbaric, San Jose, CA (US)

(73) Assignee: NXP B.V., Eindhoven (NL)

( * ) Notice: Subject to any disclaimer, the term of this patent is extended or adjusted under 35 U.S.C. 154(b) by 317 days.

(21) Appl. No.: 14/855,300

(22) Filed: Sep. 15, 2015

(65) Prior Publication Data

US 2017/0074966 A1    Mar. 16, 2017

(51) Int. Cl.
| | |
|---|---|
| *G01S 3/02* | (2006.01) |
| *G01S 5/02* | (2010.01) |
| *G06F 3/046* | (2006.01) |
| *G06K 7/10* | (2006.01) |
| *G06F 3/041* | (2006.01) |

(52) U.S. Cl.
CPC .......... *G01S 5/0294* (2013.01); *G01S 5/0221* (2013.01); *G06F 3/046* (2013.01); *G06F 3/0416* (2013.01); *G06K 7/10158* (2013.01); *G06K 7/10356* (2013.01)

(58) Field of Classification Search
CPC ........ G01S 3/02; G01S 5/0294; G01S 5/0221; G06F 3/0416; G06F 3/046; G06K 7/10158; G06K 7/10356
USPC ........................................................ 342/465
See application file for complete search history.

(56) References Cited

U.S. PATENT DOCUMENTS

| | | | |
|---|---|---|---|
| 8,350,701 B2 | 1/2013 | Carrender et al. | |
| 2005/0137933 A1* | 6/2005 | Holsen | G06Q 10/08 705/338 |
| 2006/0125602 A1 | 6/2006 | Posamentier et al. | |
| 2006/0273909 A1 | 12/2006 | Heiman et al. | |
| 2007/0126578 A1* | 6/2007 | Broussard | G06K 17/0022 340/572.1 |
| 2009/0051499 A1* | 2/2009 | Nakao | G06K 7/0008 340/10.34 |
| 2009/0146792 A1* | 6/2009 | Sadr | G06K 7/10188 340/10.3 |

(Continued)

FOREIGN PATENT DOCUMENTS

| | | |
|---|---|---|
| EP | 1 607 851 A2 | 12/2005 |
| WO | 2014/139349 A1 | 9/2014 |

OTHER PUBLICATIONS

Extended European Search Report for Patent Appln. No. 16185741.2 (dated Jan. 30, 2017).

*Primary Examiner* — Harry K Liu

(57) ABSTRACT

A device configured for tracking spatial placement of one or more HF (High frequency) RFID (Radio-frequency identification) tag objects on a surface is disclosed. The device includes an HF RFID reader, a transmission antenna, and a plurality of reception antennas. The transmission antenna effectively transmits power and data over an area that is defined to be a detection surface. Each one of the plurality of reception antennas is able to effectively receive data from a separate portion of the detection surface, while all of the plurality of reception antennas together are able to effectively receive data from substantially all of the detection surface. In one embodiment, the transmission antenna is constantly transmitting power.

18 Claims, 9 Drawing Sheets

(56) References Cited

U.S. PATENT DOCUMENTS

| | | | |
|---|---|---|---|
| 2010/0004772 A1* | 1/2010 | Elfstrom | G06Q 10/06 700/103 |
| 2010/0253470 A1* | 10/2010 | Burke | G06K 9/00885 340/5.82 |
| 2013/0181815 A1* | 7/2013 | Wang | G06K 7/10356 340/10.1 |
| 2013/0229262 A1* | 9/2013 | Bellows | H01Q 1/007 340/10.1 |
| 2014/0085052 A1* | 3/2014 | Singh | G06K 7/10356 340/10.1 |
| 2014/0197991 A1 | 7/2014 | Mkrtchyan et al. | |
| 2014/0361078 A1* | 12/2014 | Davidson | G06K 7/10356 235/385 |
| 2015/0116091 A1 | 4/2015 | Lefevre et al. | |
| 2015/0131763 A1* | 5/2015 | Jung | H04L 25/0204 375/343 |
| 2015/0370745 A1* | 12/2015 | Eckerdt | G06F 13/4221 710/105 |
| 2016/0010384 A1* | 1/2016 | Zhang | E05G 1/10 235/379 |
| 2016/0188920 A1* | 6/2016 | Kelly | G06K 7/10158 340/10.34 |
| 2017/0101302 A1* | 4/2017 | Quartarone | B67D 1/0888 |

* cited by examiner

TRACKING SPATIAL PLACEMENT OF HF RFID TAG OBJECTS ON A SURFACE USING MULTIPLE RECEPTION ANTENNAS

FIELD

The described embodiments relate generally to devices and methods that provide for tracking of RFID (Radio-frequency identification) tag objects, and more particularly to devices and methods that provide for tracking spatial placement of HF RFID tag objects on a surface using multiple reception antennas.

BACKGROUND

RFID (Radio-frequency identification) applications sometimes require the ability to detect location of an RFID tag object on an RFID reader surface. To solve this requirement, as an example, typically an HF (High frequency) RFID reader uses multiple antennas, where each single antenna has the function of both RF (Radio-frequency) Field & Data transmission and Data reception to/from the HF RFID tag object. For example, if a user wants to detect an HF RFID tag object on 10 different surface locations, then 10 Transmission/Reception antennas are used, where each antenna represents one physical location. Switching Transmission antennas is rather complex due to the high voltage conditions on the antenna coil and requirement to stay perfectly tuned to a given frequency, such as 13.56 MHz, to ensure best energy transfer. HF RFID tag objects can be powered as long as the antenna is active. Once the system switches to another antenna, then the HF RFID tag object on a previous antenna loses power (i.e., is being deactivated). As a consequence of instant switching of the Transmission antenna, the detection loop is slow since it has to reactivate the HF RFID tag object every time the antenna is switched on. Furthermore, it prevents constant energy harvesting from the RF field of the reader.

Therefore, it is desirable to have devices and methods that can overcome the following list of challenges:
1. Switching of Tx/Rx (Transmission/Reception) antenna under high voltage conditions
2. Slow detection loop due to reactivation of HF RFID tag object after each antenna switch
3. Interrupted energy harvesting

SUMMARY

This specification discloses devices and methods for tracking spatial placement of HF (High frequency) RFID (Radio-frequency identification) tag objects on a surface that use separate transmission and reception antennas. In one embodiment, the device consists of one transmission antenna that only transmits RF (Radio-frequency identification) field and data to the HF RFID tag object. The transmission antenna can be large enough, to cover all detection fields (as shown in FIGS. 1A and 1B), or the transmission antenna can be split into smaller sections (as shown in FIGS. 2A and 2B). When using a single transmission antenna, all the HF RFID tag objects are constantly powered, which enables uninterrupted energy harvesting and eliminates the need for continuous activation/deactivation loop.

To track HF RFID tag object on a surface, multiple reception antennas are used. Each detection field has one reception antenna, which is connected to a reception antenna multiplexer. Compared to traditional solutions, only reception antennas are being switched. Due to low voltage conditions on the reception antenna coil, a simple off-the-shelf analog multiplexer can be used. In one embodiment, the reception antenna can be switched single ended (as shown in FIG. 4), where one end of the reception antenna is tied to Ground potential. In another embodiment, configuration with differential reception antenna (as shown in FIG. 5) can be applied.

All disclosed embodiments enjoy the advantages of overcoming the following list of challenges:
1. Switching of Tx/Rx (Transmission/Reception) antenna under high voltage conditions
2. Slow detection loop due to reactivation of HF RFID tag object after each antenna switch
3. Interrupted energy harvesting In one embodiment, a device configured for tracking spatial placement of one or more HF (High frequency) RFID (Radio-frequency identification) tag objects on a surface is disclosed. The device includes an HF RFID reader, a transmission antenna, and a plurality of reception antennas. The transmission antenna effectively transmits power and data over an area that is defined to be a detection surface. The one or more HF RFID tag objects are effectively powered by the transmission antenna within the detection surface. Each one of the plurality of reception antennas is able to effectively receive data from a portion of the detection surface. In one embodiment, the transmission antenna is constantly transmitting power. In one embodiment, the transmission antenna has one of the following shapes: circle, square, daisy, rectangle. In one embodiment, the detection surface is a flat surface, a curved surface, or a combination of flat and curved surfaces. In one embodiment, each one of the plurality of reception antennas is able to effectively receive data from a separate portion of the detection surface. In one embodiment, all of the plurality of reception antennas together are able to effectively receive data from substantially all of the detection surface. In one embodiment, all of the plurality of reception antennas together are able to effectively receive data from only a part of the detection surface. In one embodiment, the device further includes a switching unit configured to connect the HF RFID reader to one of the plurality of reception antennas. In one embodiment, each one of the plurality of reception antennas has a first output that is connected to a common ground and a second output that is connected to the switching unit. In one embodiment, each one of the plurality of reception antennas has both outputs that are connected to the switching unit.

In one embodiment, a device configured for tracking spatial placement of one or more RFID (Radio-frequency identification) tag objects within a detection range is disclosed. The device includes an RFID reader, a transmission antenna, and a plurality of reception antennas. The transmission antenna effectively transmits power over an area or a volume that is defined to be a detection range. The one or more RFID tag objects are effectively powered by the transmission antenna within the detection range. Each one of the plurality of reception antennas is able to effectively receive data from a portion of the detection surface. In one embodiment, the transmission antenna is constantly transmitting power. In one embodiment, each one of the plurality of reception antennas is able to effectively receive data from a separate portion of the detection range. In one embodiment, all of the plurality of reception antennas together are able to effectively receive data from substantially all of the detection range. In one embodiment, the RFID reader is an HF (High frequency) RFID reader, and the one or more RFID tag objects are HF RFID tag objects.

In one embodiment, a method for tracking spatial placement of an RFID (Radio-frequency identification) tag object on a surface is disclosed. The method includes constantly transmitting power and data from a transmission antenna, where the transmission antenna effectively transmits power and data over an area that is defined to be a detection surface. The method further includes utilizing a plurality of reception antennas to detect the spatial placement of the RFID tag object on the detection surface. Each one of the plurality of reception antennas is able to effectively receive data from a portion of the detection surface. The spatial placement is determined based on which one of the plurality of reception antennas detects the RFID tag object. In one embodiment, each one of the plurality of reception antennas is able to effectively receive data from a separate portion of the detection surface. In one embodiment, all of the plurality of reception antennas together are able to effectively receive data from substantially all of the detection surface. In one embodiment, the step of utilizing a plurality of reception antennas to detect the spatial placement of the RFID tag object on the detection surface includes utilizing a switching unit to connect an RFID reader to each one of the plurality of reception antennas. In one embodiment, the RFID reader is an HF (High frequency) RFID reader, and the RFID tag object is an HF RFID tag object.

The above summary is not intended to represent every example embodiment within the scope of the current or future Claim sets. Additional example embodiments are discussed within the Figures and Detailed Description below.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 1A shows the partial device (by not including the multiple reception antennas), while FIG. 1B shows the full device (by including the multiple reception antennas).

FIG. 2A shows the partial device (by not including the multiple reception antennas), while FIG. 2B shows the full device (by including the multiple reception antennas).

FIG. 3A shows the partial device (by not including the multiple reception antennas), while FIG. 3B shows the full device (by including the multiple reception antennas).

DETAILED DESCRIPTION

Figure 1A:
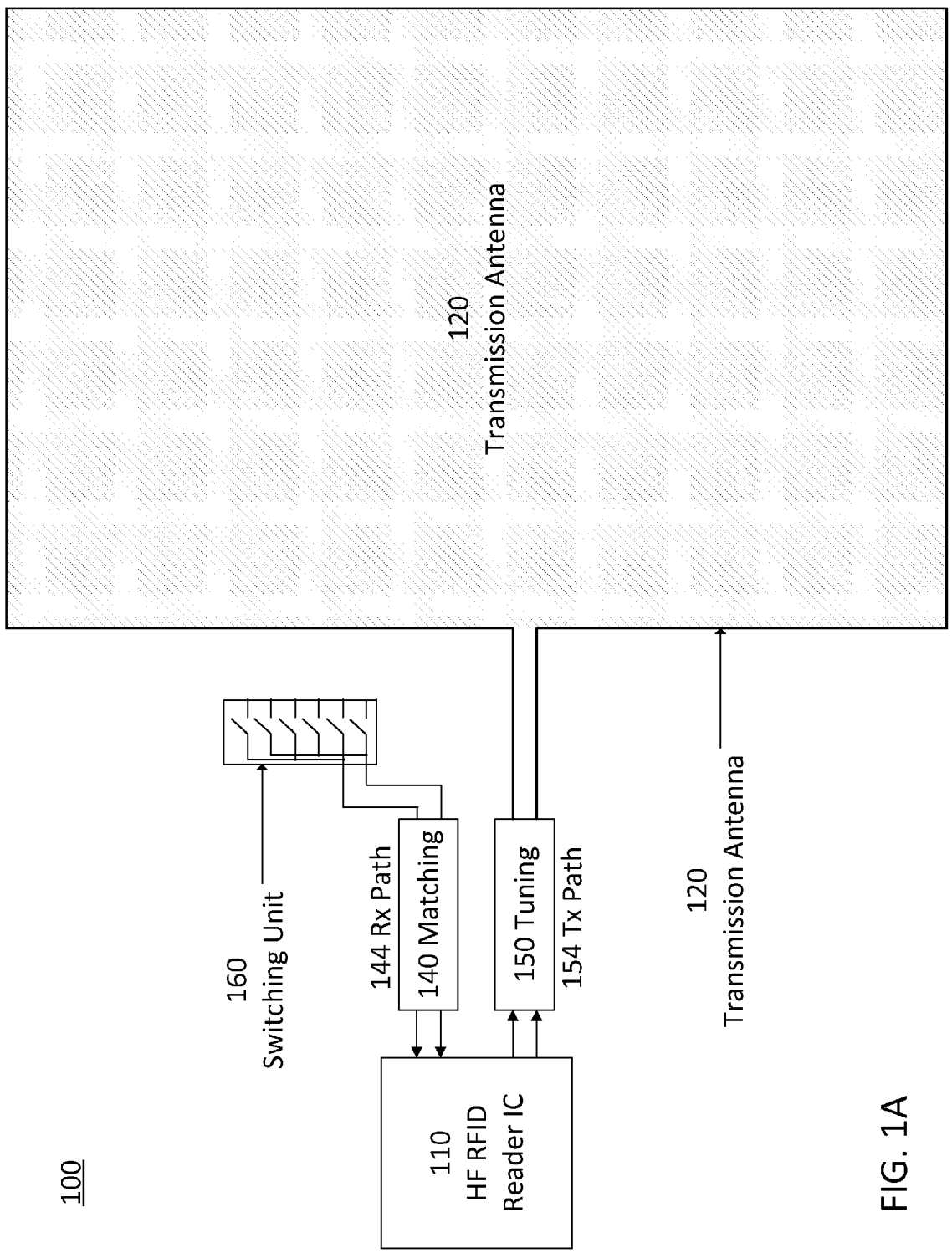
FIGS. 1A and 1B show a first device that is configured for tracking spatial placement of one or more HF RFID tag objects on a surface, where the transmission antenna is large enough to cover all detection fields, in accordance with some example embodiments.

Representative devices and methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other embodiments are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

One of the key disclosure is the usage of multiple data Reception antennas for localizing the HF RFID tag objects on a surface, while keeping the number of Transmission antenna at one. With such a configuration, only a single transmission antenna transmits RF field and data to the HF RFID tag object, while multiple reception antennas are used to track HF RFID tag object on the surface. In one embodiment, the single transmission antenna can be large enough, to cover all detection fields. In another embodiment, the transmission antenna can be split into smaller sections. When using a single transmission antenna, all the HF RFID tag objects are constantly powered, which enables uninterrupted energy harvesting and eliminates the slow detection loop due to reactivation of HF RFID tag object after each antenna switch. There is also the advantage that there are no longer any need for the switching of Tx/Rx (Transmission/Reception) antenna under high voltage conditions, since all antennas are now either a Tx (Transmission) antenna or a Rx (Reception) antenna.

To track HF RFID tag object on a surface, multiple reception antennas are used, so that each detection field has one reception antenna. In order to reduce cost and simplify the design, the device uses only one HF RFID reader. A switching unit, such as a multiplexer, can be used to connect the multiple reception antennas to the single HF RFID reader. In one embodiment, the switching unit can sequentially connect each reception antennas to the single HF RFID reader. This can be done using a fixed switching frequency, so that each reception antenna is only connected for a fixed amount of time. Or, alternatively, the switching frequency can be varying, and the connect time can be also varying. Or, an algorithm can be applied to perform this switching. The reception antenna coil functions under low voltage conditions, so a simple standard analog multiplexer can be used. In one embodiment, the reception antenna has one output connected to the switching unit and a second output connected to a common ground potential. In another embodiment, the reception antenna has both outputs connected to the switching unit.

Figure 1B:
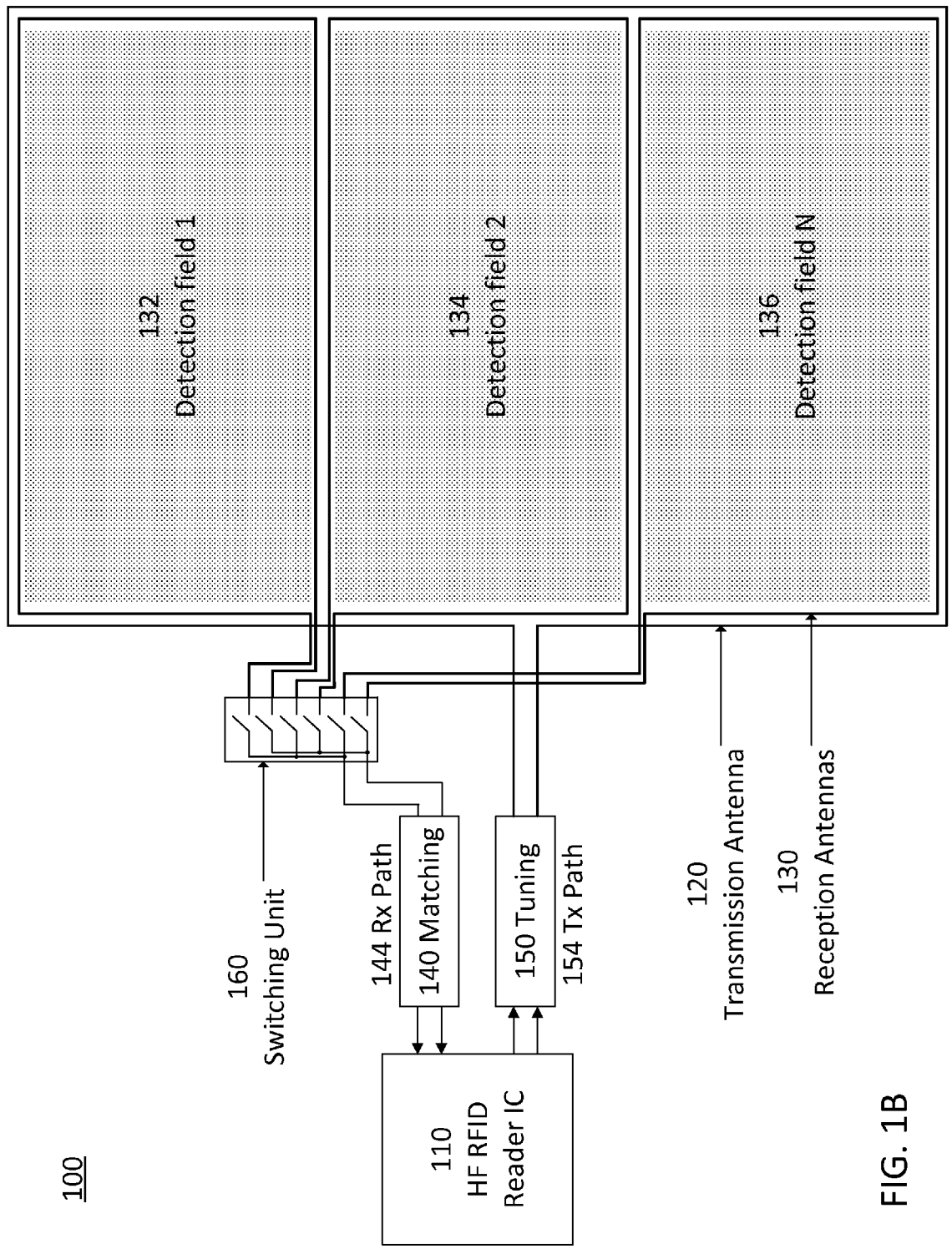

FIGS. 1A and 1B show a first device 100 that is configured for tracking spatial placement of one or more HF RFID tag objects on a surface, where the transmission antenna 120 is a large single Tx (transmission) antenna (that is large enough to cover all detection fields). FIG. 1A shows the partial device (by not including the multiple reception antennas 130), while FIG. 1B shows the full device (by including the multiple reception antennas 130).

FIGS. 1A and 1B show that device 100 includes a HF RFID reader IC (integrated circuit) 110, a transmission antenna 120, multiple reception antennas 130, Rx path 144, Rx matching unit 140, Tx path 154, Tx tuning unit 150, and a switching unit 160. The HF RFID reader IC 110 powers the single transmission antenna 120 through the Tx path 154. The transmission antenna effectively transmits power and data over an area that is defined to be a detection surface. To a first approximation, the transmission antenna effectively transmits power over an area that is roughly equivalent to the 2-D (2-dimensional) dimensions of the transmission antenna. However, in practice, the actual "effective" area is larger, since the RF fields can extend beyond the 2-D dimensions of the transmission antenna. Therefore, the actual "effective" area (i.e., the detection surface) is the area within which the HF RFID tag object can be effectively powered by the transmission antenna. In other words, the condition is that the one or more HF RFID tag objects are effectively powered by the transmission antenna within the detection surface. Furthermore, more generally, the transmission antenna transmits power in a 3-D (3-dimensional) manner, so that the transmission antenna is actually effectively transmitting power over a volume. Therefore, more generally, the transmission antenna effectively transmits power and data over an area or a volume that is defined to be a detection range. This detection range would be larger than the 3-D (3-dimensional) dimensions of the transmission antenna, since the RF fields can extend beyond the 3-D dimensions of the transmission antenna. Therefore, the detection range is the actual "effective" volume within which the HF RFID tag object can be effectively powered by the transmission antenna. In other words, the condition is that the one or more HF RFID tag objects are effectively powered by the transmission antenna within the detection range.

In one embodiment, the transmission antenna is constantly transmitting power. In one embodiment, the detection surface is a flat surface. In one embodiment, the detection surface is a curved surface. In one embodiment, the detection surface is a combination of flat and curved surfaces.

In FIGS. 1A and 1B, the Tx (transmission) path 154 consist of a single large antenna 120, while several smaller antennas are used for the Rx (reception) path 144, where each Rx antenna covers one detection field. In FIG. 1B, the detection fields are shown to be detection field 1 (132), detection field 2 (134), and detection field N (136). In FIG. 1B, N equals 3, but in general N can be any number, depending on how precise (or to what resolution) the user wish to track the spatial placement of the HF RFID tag objects. If N is large, then the spatial resolution would be high, and the placement tracking more precise. If N is small, then the spatial resolution would be low, and the placement tracking less precise. But, of course, with a single HF RFID reader and a switching unit, then a large N will slow the device down. The device can be sped up with multiple HF RFID readers, but then the cost and design complexity will also go up.

In FIGS. 1A and 1B, a switching unit 160 is used to connect the multiple reception antennas to the single HF RFID reader. In one embodiment, the switching unit 160 is a multiplexer.

Figure 2A:
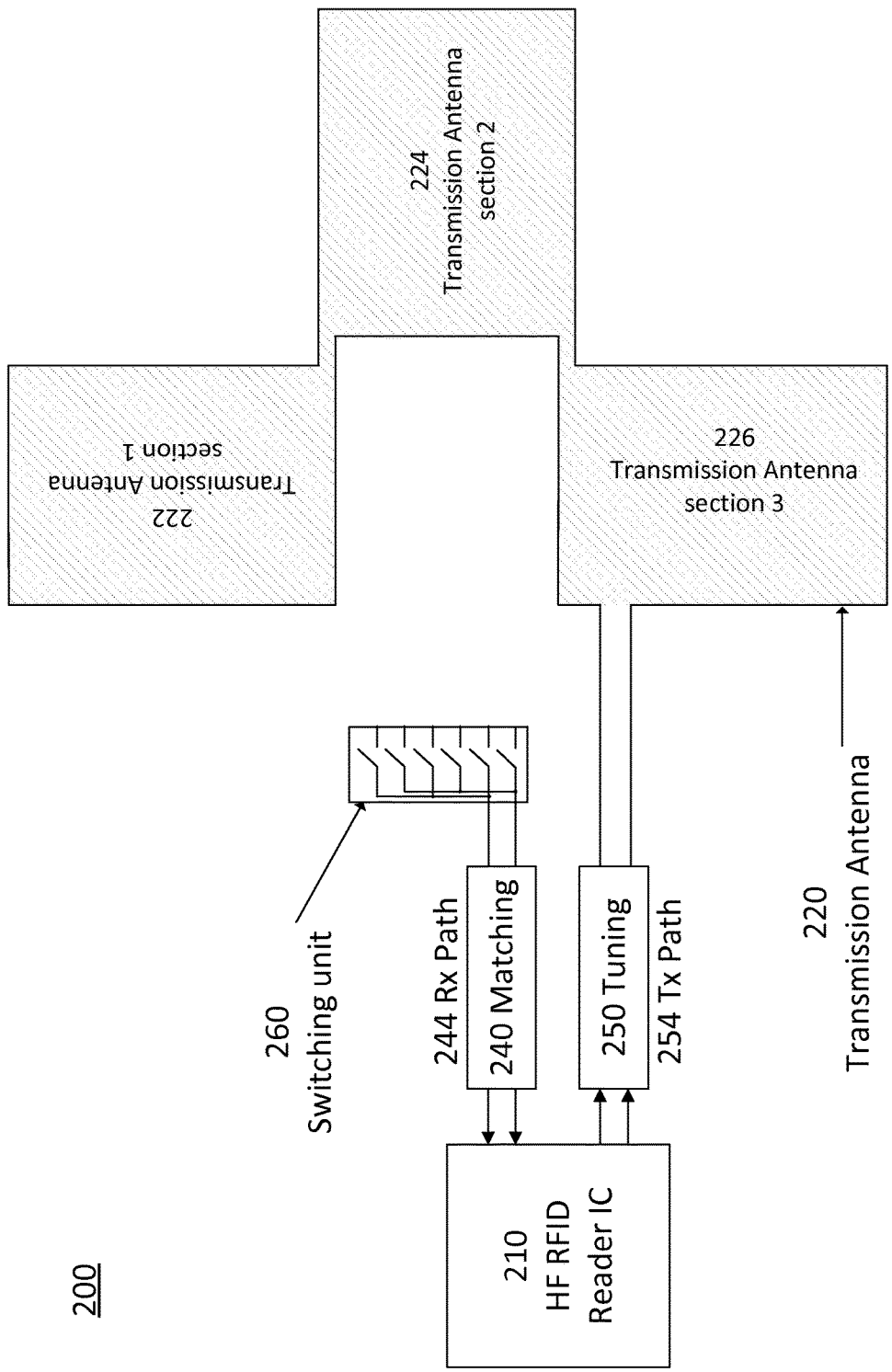
FIGS. 2A and 2B show a second device that is configured for tracking spatial placement of one or more HF RFID tag objects on a surface, where the transmission antenna is split into smaller sections, in accordance with some example embodiments.
Figure 2B:
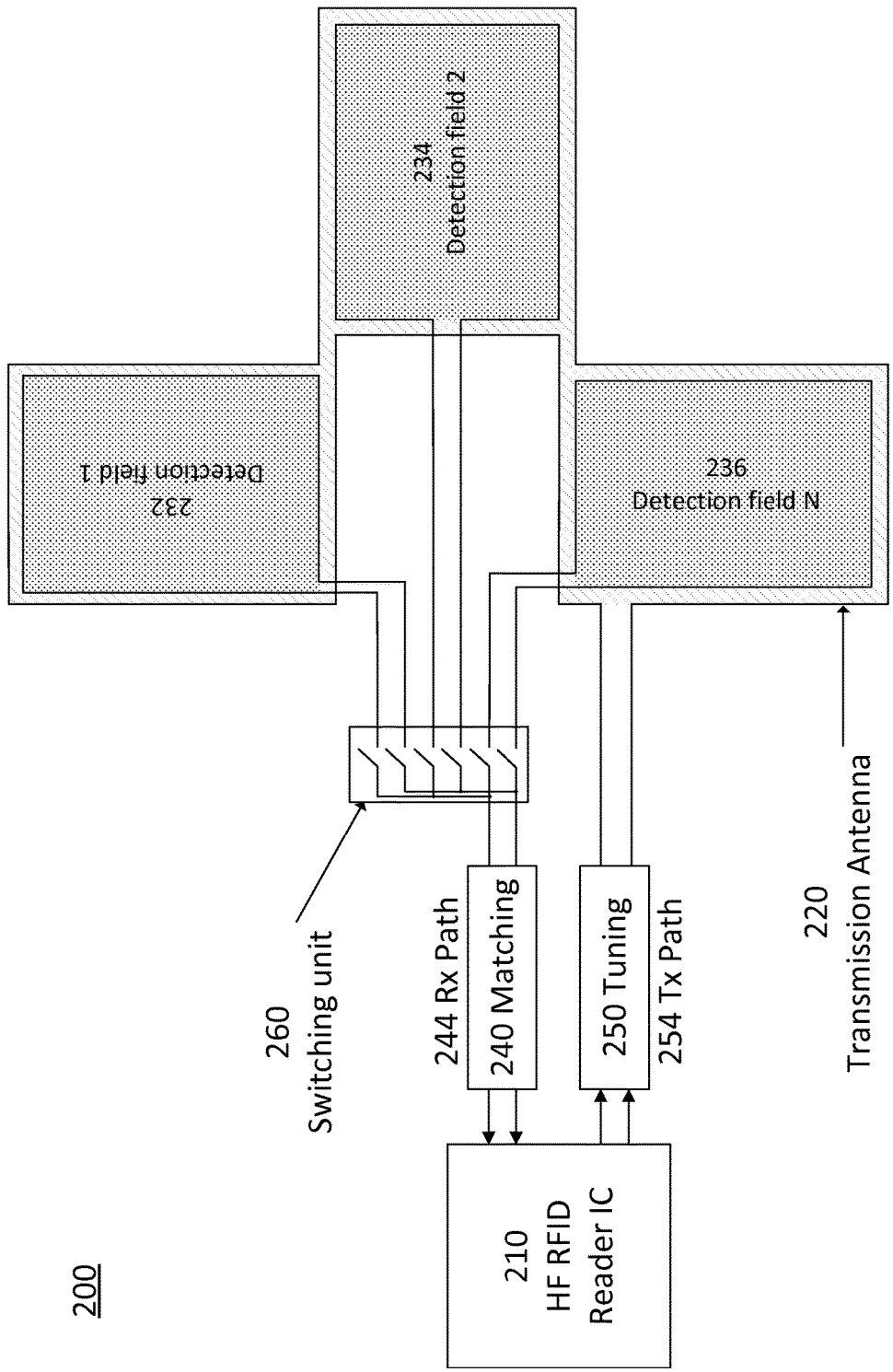

FIGS. 2A and 2B show a second device 200 that is configured for tracking spatial placement of one or more HF RFID tag objects on a surface, where the transmission antenna 220 is split into smaller sections. FIG. 2A shows the partial device (by not including the multiple reception antennas), while FIG. 2B shows the full device (by including the multiple reception antennas). More generally, FIGS. 2A and 2B shows an example of a sectional antenna for the Tx path, which is generating a solid RF field distribution within each detecting field, where the Tx path antenna consists of several small sections.

FIGS. 2A and 2B show that device 200 includes a HF RFID reader IC 210, a transmission antenna 220, multiple reception antennas, Rx path 244, Rx matching unit 240, Tx path 254, Tx tuning unit 250, and a switching unit 260. The HF RFID reader IC 210 powers the single transmission antenna 220 through the Tx path 254. Device 200 is very similar to device 100, except the transmission antenna 220 is made up of several small sections: transmission antenna section 1 (222), transmission antenna section 2 (224), and transmission antenna section 3 (226). Device 200 only shows three small sections for transmission antenna 220, but other numbers of sections are also possible. The three small sections for transmission antenna 220 are shaped as rectangles, but other shapes are also possible. In other embodiments, the transmission antenna and the small transmission antenna sections can have the following shapes: circle, square, daisy, rectangle, or some other shapes. The number of small sections and shapes can be dependent on the particular application of the device configured for tracking spatial placement of HF RFID tag objects on a surface.

In FIGS. 2A and 2B, the Rx (reception) path 244 consists of several smaller antennas, where each Rx antenna covers one detection field. In FIG. 2B, the detection fields are shown to be detection field 1 (232), detection field 2 (234), and detection field N (236). In FIG. 2B, N equals 3, but in general N can be any number, depending on how precise (or to what resolution) the user wishes to track the spatial placement of the HF RFID tag objects.

Figure 3A:
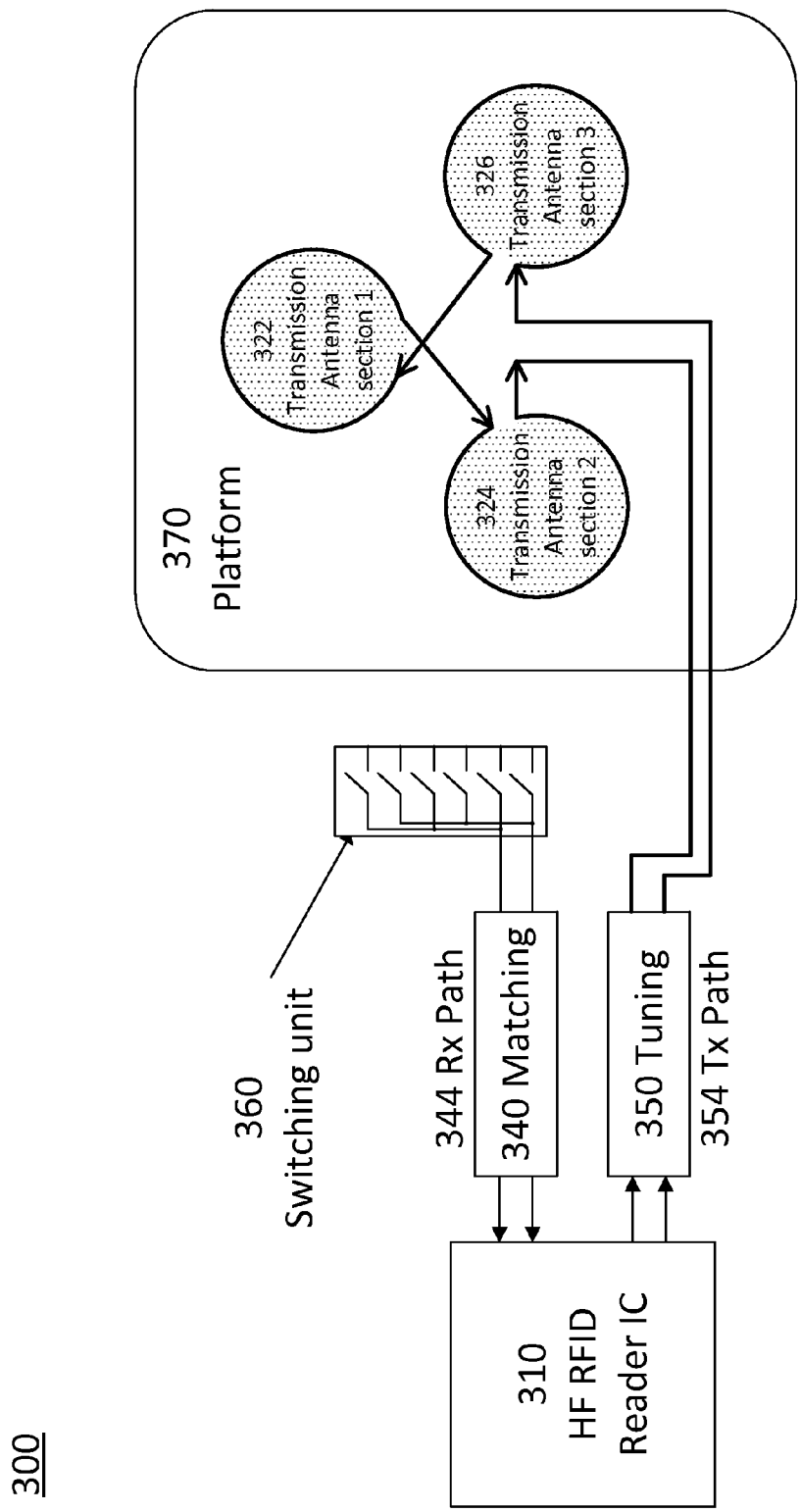
FIGS. 3A and 3B show a third device that is configured for tracking spatial placement of one or more HF RFID tag objects on a surface, where the transmission antenna is split into three smaller sections shaped like a daisy, in accordance with some example embodiments.
Figure 3B:
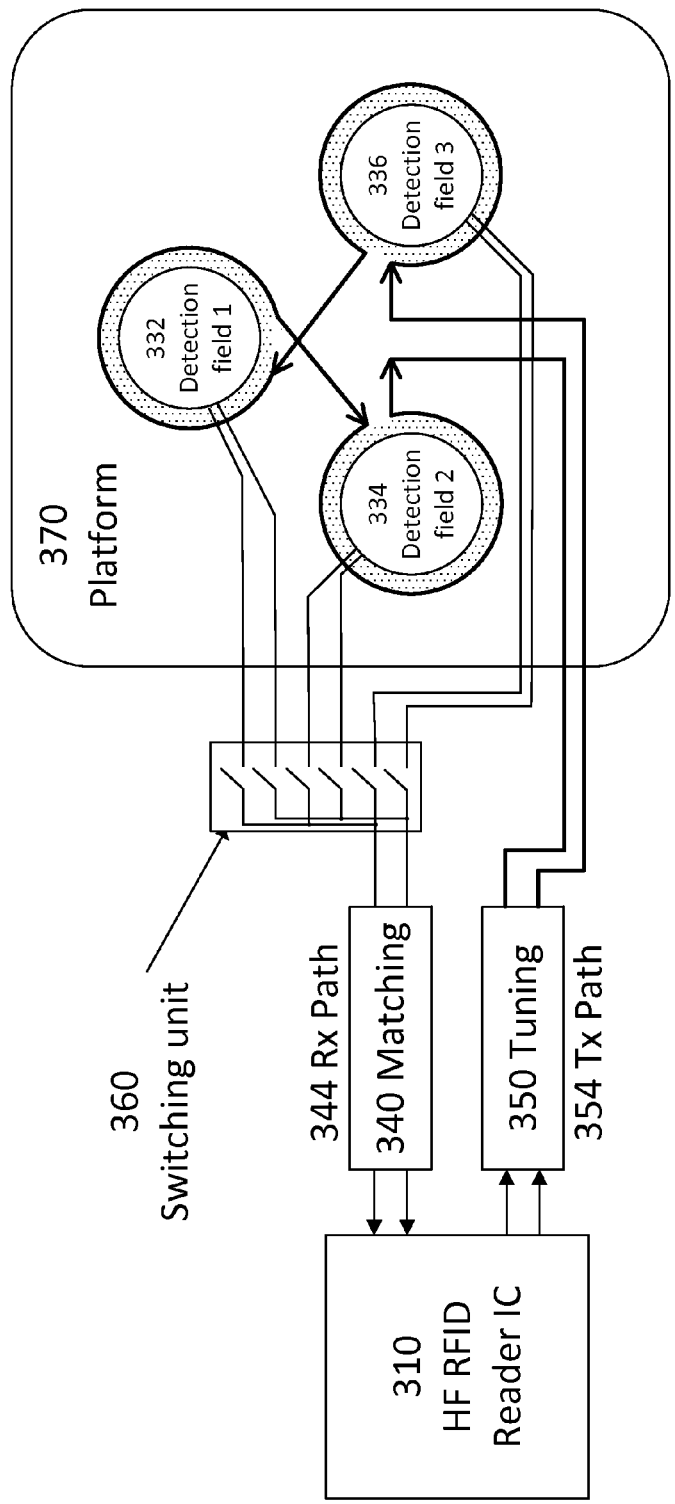

FIGS. 3A and 3B show a third device 300 that is configured for tracking spatial placement of one or more HF RFID tag objects on a surface, where the transmission antenna is split into three smaller sections shaped like a daisy. FIG. 3A shows the partial device (by not including the multiple reception antennas), while FIG. 3B shows the full device (by including the multiple reception antennas). More generally, FIGS. 3A and 3B shows an example of a sectional antenna for the Tx path, which is generating a solid RF field distribution within each detecting field, where the Tx path antenna is shaped like a daisy. This shows that various shapes are possible for both the transmission and the reception antennas.

FIGS. 3A and 3B show that device 300 includes a HF RFID reader IC 310, a transmission antenna with several small sections, multiple reception antennas, Rx path 344, Rx matching unit 340, Tx path 354, Tx tuning unit 350, a switching unit 260, and a platform 370. The HF RFID reader IC 310 powers a single transmission antenna through the Tx path 354. Device 300 is very similar to device 200, except the transmission antenna (which includes three small sections) is now shaped like a daisy, instead of the rectangle shapes shown in device 200. In particular, the transmission antenna is made up of several small sections: transmission antenna section 1 (322), transmission antenna section 2 (324), and transmission antenna section 3 (326).

In FIGS. 3A and 3B, the Rx (reception) path 344 consists of several smaller antennas, where each Rx antenna covers one detection field. In FIG. 3B, the detection fields are shown to be detection field 1 (332), detection field 2 (334), and detection field N (336), where N equals 3.

FIGS. 3A and 3B also show a platform 370, which can be used to house the transmission and reception antennas, as well as provide support for the one or more RFID tag objects.

Figure 4:
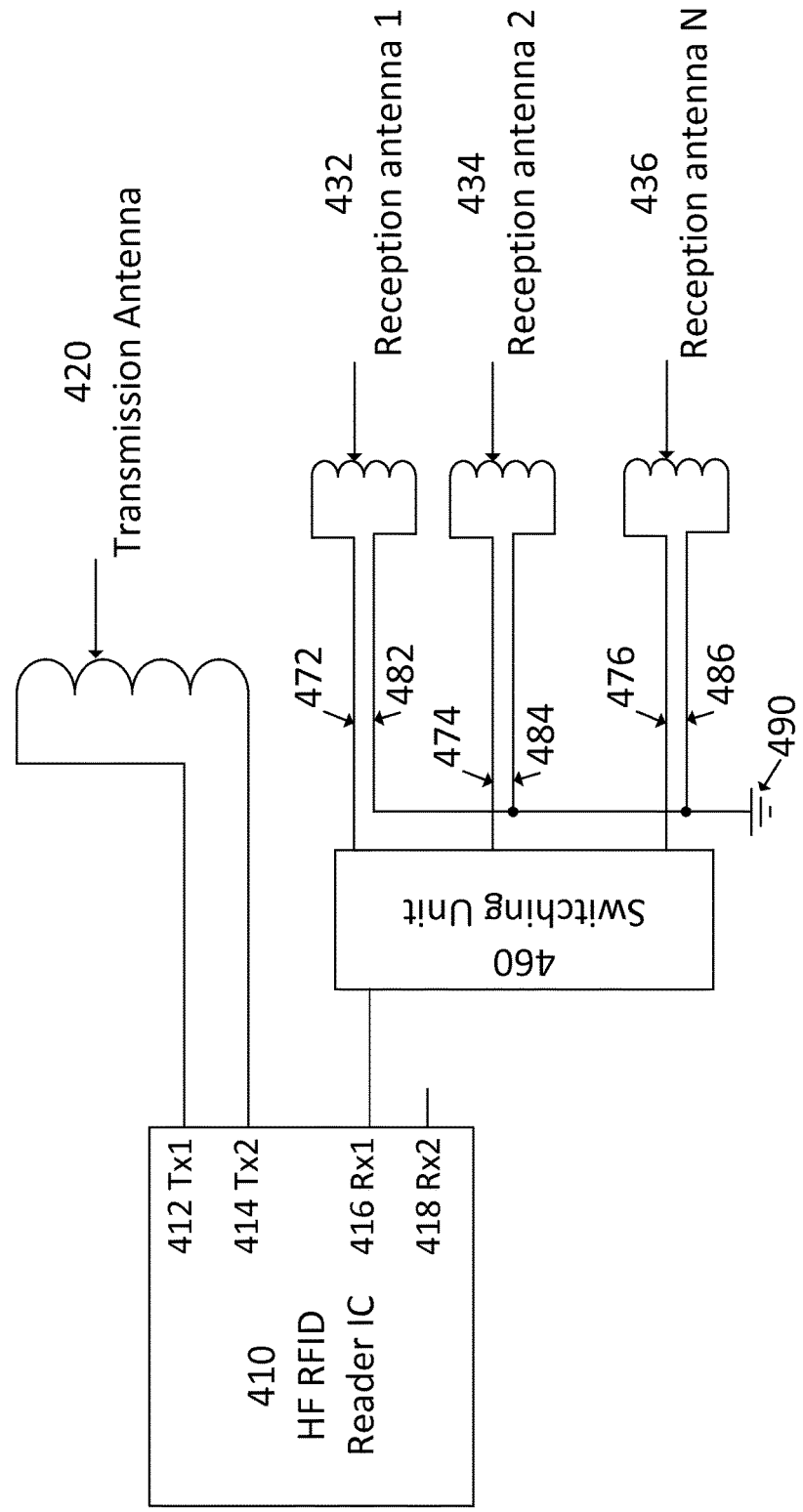
FIG. 4 shows a fourth device that is configured for tracking spatial placement of one or more HF RFID tag objects on a surface, where each of the multiple reception antennas has one end tied to Ground potential, in accordance with some example embodiments.

FIG. 4 shows a fourth device 400 that is configured for tracking spatial placement of one or more HF RFID tag objects on a surface, where each of the multiple reception antennas has one end tied to Ground potential. In particular, FIG. 4 shows that device 400 includes a HF RFID reader IC 410, a transmission antenna 420, multiple reception antennas (432, 434, 436), and a switching unit 460. The transmission antenna 420 is connected to the HF RFID reader IC 410 through two connections on HF RFID reader IC 410: Tx1 (412) and Tx2 (414). The reception antennas (432, 434, 436) are connected to the HF RFID reader IC 410 through a switching unit 460. In device 400, each one of the plurality of reception antennas (432, 434, 436) has a first output (482, 484, 486) that is connected to a common ground 490 and a second output (472, 474, 476) that is connected to connection Rx1 (416) on HF RFID reader IC 410 via the switching unit 460.

Figure 5:
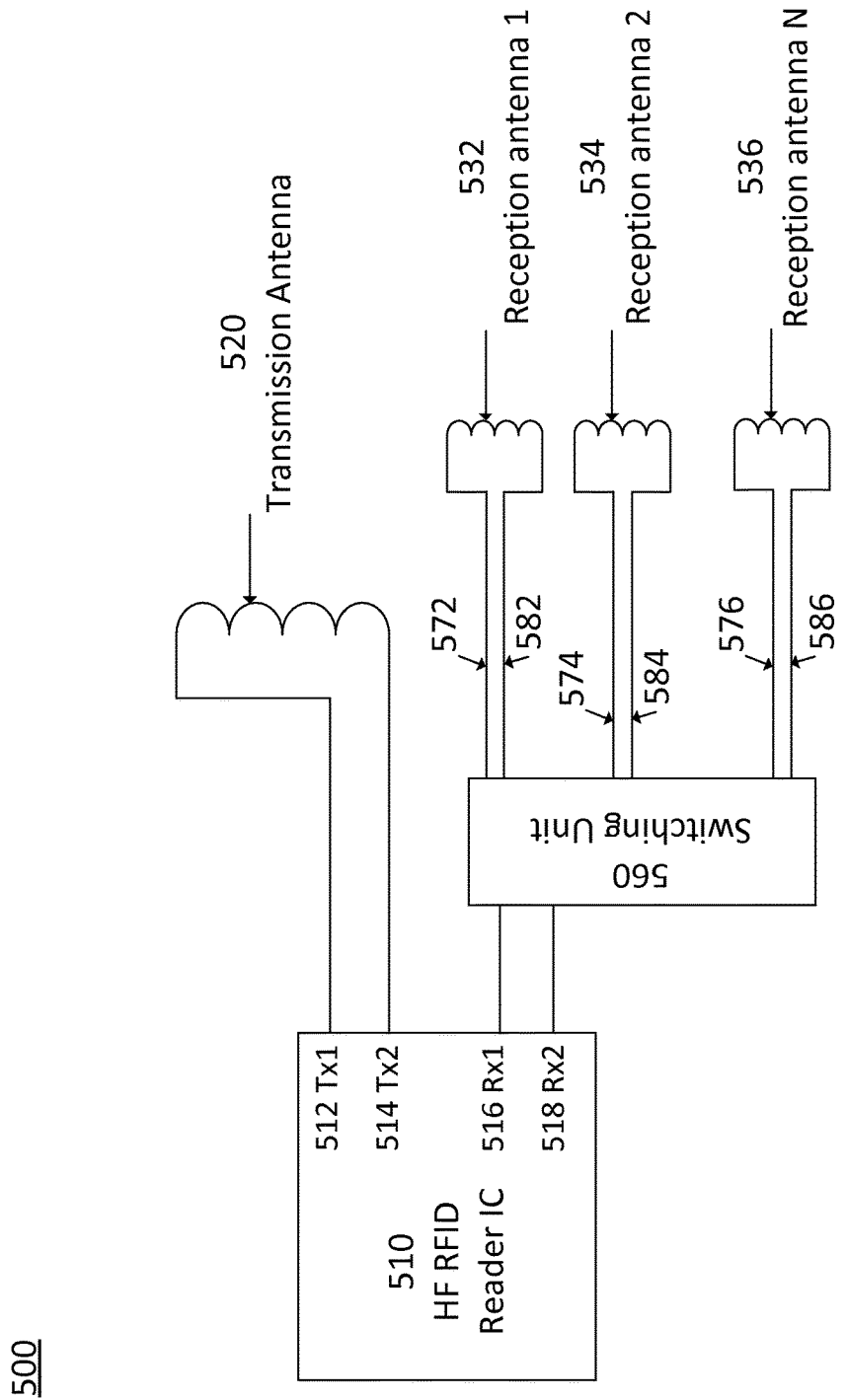
FIG. 5 shows a fifth device that is configured for tracking spatial placement of one or more HF RFID tag objects on a surface, where each of the multiple reception antennas has both ends of the reception antenna tied to the switching unit (e.g., a multiplexer), in accordance with some example embodiments.

FIG. 5 shows a fifth device 500 that is configured for tracking spatial placement of one or more HF RFID tag objects on a surface, where each of the multiple reception antennas has both ends of the reception antenna tied to the switching unit (e.g., a multiplexer). In particular, FIG. 5 shows that device 500 includes a HF RFID reader IC 510, a transmission antenna 520, multiple reception antennas (532, 534, 536), and a switching unit 560. The transmission antenna 520 is connected to the HF RFID reader IC 510 through two connections on HF RFID reader IC 510: Tx1 (512) and Tx2 (514). The reception antennas (532, 534, 536) are connected to the HF RFID reader IC 510 through a switching unit 560. In device 500, each one of the plurality of reception antennas (532, 534, 536) has both outputs (582, 584, 586, 572, 574, 576) that are connected to connections Rx1 (516) and Rx2 (518) on HF RFID reader IC 510 via the switching unit 560. Outputs 572, 574, 576 are connected to Rx1 (516) on HF RFID reader IC 510 via the switching unit 560, while outputs 582, 584, 586 are connected to Rx2 (518) on HF RFID reader IC 510 via the switching unit 560

Figure 6:
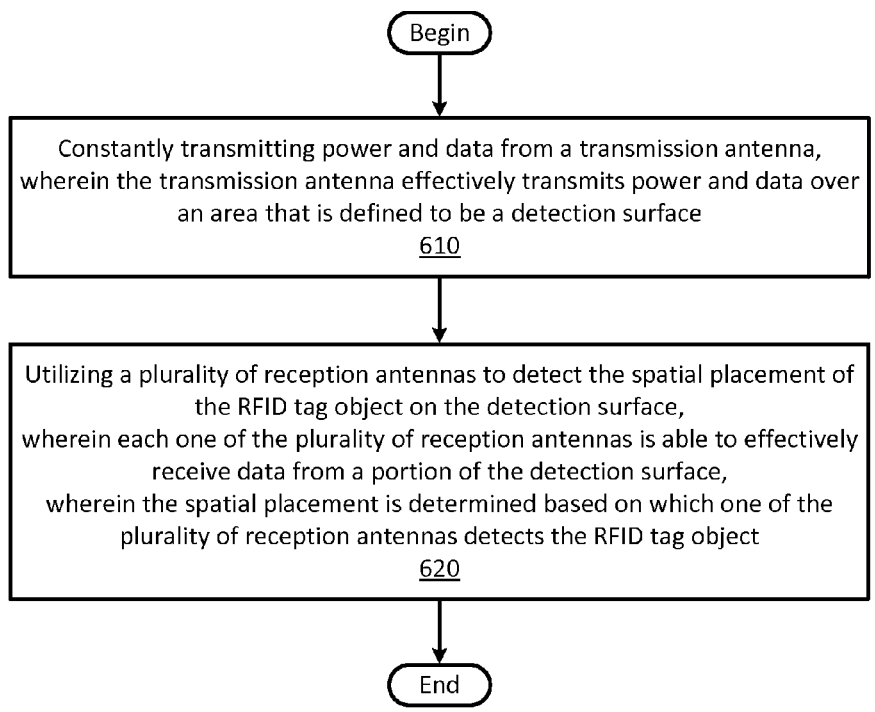
FIG. 6 shows a flow chart of method steps for tracking spatial placement of an RFID tag object on a surface, in accordance with some example embodiments.

FIG. 6 shows a flow chart of method steps for tracking spatial placement of an RFID tag object on a surface, in accordance with some example embodiments. As shown in FIG. 6, the method 600 begins at step 610, where the method constantly transmits power and data from a transmission antenna, wherein the transmission antenna effectively transmits power and data over an area that is defined to be a detection surface. Then, the method proceeds to step 620. In step 620, the method utilizes a plurality of reception antennas to detect the spatial placement of the RFID tag object on the detection surface, wherein each one of the plurality of reception antennas is able to effectively receive data from a portion of the detection surface, wherein the spatial placement is determined based on which one of the plurality of reception antennas detects the RFID tag object.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device configured to track spatial placement of one or more Radio Frequency Identification (RFID) tag objects on a surface, the device comprising:
   an RFID reader;
   a single transmission antenna; and
   a plurality of reception antennas, wherein the single transmission antenna is configured to effectively transmit power and data over an area that is defined to be a detection surface, the one or more RFID tag objects are constantly powered by the single transmission antenna within the detection surface, and each one of the plurality of reception antennas is configured to effectively receive data from a portion of the detection surface.

2. The device of claim 1, wherein the single transmission antenna is configured to constantly transmit power.

3. The device of claim 2, wherein the single transmission antenna has one of the following shapes: circle, square, daisy, rectangle.

4. The device of claim 2, wherein the detection surface is a flat surface, a curved surface, or a combination of flat and curved surfaces.

5. The device of claim 2, wherein each one of the plurality of reception antennas is configured to effectively receive data from a separate portion of the detection surface.

6. The device of claim 5, wherein all of the plurality of reception antennas together are configured to effectively receive data from substantially all of the detection surface.

7. The device of claim 5, wherein all of the plurality of reception antennas together are configured to effectively receive data from only a part of the detection surface.

8. The device of claim 2 further comprising:
   a switching unit configured to connect the RFID reader to one of the plurality of reception antennas.

9. The device of claim 8, wherein each one of the plurality of reception antennas has a first output that is connected to a common ground and a second output that is connected to the switching unit.

10. The device of claim 8, wherein each one of the plurality of reception antennas has both outputs that are connected to the switching unit.

11. A device configured for tracking spatial placement of one or more Radio Frequency Identification (RFID) tag objects within a detection range, the device comprising:
   an RFID reader;

a single transmission antenna; and a plurality of reception antennas, the single transmission antenna is configured to effectively transmit power over an area or a volume that is defined to be a detection range, the one or more RFID tag objects are constantly powered by the single transmission antenna within the detection range, and each one of the plurality of reception antennas is configured to effectively receive data from a portion of the detection surface.

12. The device of claim 11, wherein the single transmission antenna is configured to constantly transmit power.

13. The device of claim 12, wherein each one of the plurality of reception antennas is configured to effectively receive data from a separate portion of the detection range.

14. The device of claim 13, wherein all of the plurality of reception antennas together are configured to effectively receive data from substantially all of the detection range.

15. A method for tracking spatial placement of an Radio Frequency Identification (RFID) tag object on a surface, the method comprising:

constantly transmitting power and data from a single transmission antenna, wherein the single transmission antenna is configured to effectively transmit power and data over an area that is defined to be a detection surface;

utilizing a plurality of reception antennas to detect the spatial placement of the RFID tag object on the detection surface, wherein each one of the plurality of reception antennas is configured to effectively receive data from a portion of the detection surface, the RFID tag object is constantly powered by the single transmission antenna within the detection surface, and the spatial placement is determined based on which one of the plurality of reception antennas detects the RFID tag object.

16. The method of claim 15, wherein each one of the plurality of reception antennas is configured to effectively receive data from a separate portion of the detection surface.

17. The method of claim 16, wherein all of the plurality of reception antennas together are configured to effectively receive data from substantially all of the detection surface.

18. The method of claim 15, wherein the step of utilizing the plurality of reception antennas to detect the spatial placement of the RFID tag object on the detection surface further comprises:

utilizing a switching unit to connect an RFID reader to each one of the plurality of reception antennas.

* * * * *